US008442889B2

(12) United States Patent
Farrow (10) Patent No.: US 8,442,889 B2
(45) Date of Patent: May 14, 2013

(54) ASSET ALLOCATION BASED SYSTEM FOR INDIVIDUAL INVESTOR PORTFOLIO SELECTION

(76) Inventor: Darrin B. Farrow, Westlake, OH (US)

( * ) Notice: Subject to any disclaimer, the term of this patent is extended or adjusted under 35 U.S.C. 154(b) by 1990 days.

(21) Appl. No.: 10/888,965

(22) Filed: Jul. 12, 2004

(65) Prior Publication Data

US 2006/0010053 A1   Jan. 12, 2006

(51) Int. Cl.
*G06Q 40/00* (2006.01)
(52) U.S. Cl.
USPC .............. 705/36 R; 705/35; 705/37; 705/38
(58) Field of Classification Search .............. 705/36 R, 705/35–38
See application file for complete search history.

(56) References Cited

U.S. PATENT DOCUMENTS

| | | | |
|---|---|---|---|
| 6,154,732 A | 11/2000 | Tarbox | |
| 6,393,409 B2 | 5/2002 | Young et al. | |
| 6,405,179 B1 | 6/2002 | Rebane | |
| 6,430,542 B1 | 8/2002 | Moran | |
| 6,484,151 B1 | 11/2002 | O'Shaughnessy | |
| 6,510,419 B1 | 1/2003 | Gatto | |
| 6,513,020 B1 | 1/2003 | Weiss et al. | |
| 6,681,211 B1 | 1/2004 | Gatto | |
| 2002/0062271 A1 | 5/2002 | Breuninger | |
| 2002/0107770 A1 | 8/2002 | Meyer et al. | |
| 2002/0143680 A1 | 10/2002 | Walters et al. | |
| 2002/0152151 A1 | 10/2002 | Baughman et al. | |
| 2002/0169701 A1 | 11/2002 | Tarbox et al. | |
| 2003/0018557 A1 | 1/2003 | Gilbert et al. | |
| 2003/0028464 A1 | 2/2003 | Kosinski | |
| 2004/0176972 A1 | 9/2004 | Baba et al. | |
| 2005/0010516 A1* | 1/2005 | Ivanov et al. .................. 705/36 |
| 2005/0027632 A1* | 2/2005 | Zeitoun et al. ................. 705/36 |

OTHER PUBLICATIONS

Stephen Barr, "Lifecycle" Option Would Help TSP Participants Balance Investments, Mar. 16, 2004, The Washington Post, p. B.02.*

* cited by examiner

*Primary Examiner* — Lindsay M Maguire
*Assistant Examiner* — Hao Fu
(74) *Attorney, Agent, or Firm* — Pearne & Gordon LLP (57) ABSTRACT

A system for allocation asset based portfolio investment and management provides model portfolios which are selected by correlation to investor's responses to a questionnaire concerning time frames and risk tolerance. Recommended model portfolios are presented to investors by asset allocation class percentages only, without identification of any specific securities of fund holdings of the portfolio and without enabling the participating investor to choose or delete specific assets for inclusion in the recommended portfolio. The system enables the investor only to alter the asset allocation. The model portfolios are professionally overseen and managed for compliance with projected returns and conformance to the assigned asset class. The system can be executed on paper or in the form of computer software run locally or on a network.

14 Claims, 6 Drawing Sheets

Log Out

Home | Participant Access | Retirement Info

Portfolio Builder

Section Guide
My Portfolio
Account Summary
Detail Summary
Change Contribution Rate
Statements
Transaction History
Contribution History
My Email
Change Portfolio/ Retake Questionaire
Personal Info
Employment Info
Loans
Distributions
Rollovers
Fund Info
Plan Highlights
Summary Plan Description
Your Retirement Coach
Retirement Calculator
Change Password
FAQ
Contact Us

Your Recommended Model Portfolio
The following asset allocation model reflects your answers to the questions on the preceeding pages.
It is strongly recommended that you accept this portfolio model.
The economy is always changing as well as what is important to you in life. Please retake the investor profile questionaire every twelve months if you have more than five years until retirement, and every six months if you have less than five years until retirement, and every appropiate professionally managed portfolio. Notice that mutual funds are not shown. Modern Portfolio Theory suggests that to 90% of a portfolio's returns come from asset allocation, not fund performance (source: Portfolio Theory) After you have chosen your model portfolio, funds and returns will be shown. You may select Fund Info for a copy of a prospectus. Please read it carefully.

To set up this asset allocation model for your account, click below. If you do think this portfolio is appropriate for you and doesn't reflect your investment objectives, click on the arrows below to view the next, more aggressive, or less aggressive portfolios.
} 36

Moderate Conservative 35% Stocks — 50% Bonds — 15% Cash  /34
34 ~                                                    -32

☒ 6% Large Growth         ☐ 3% International Value
☒ 7% Large Blend          ☐ 3% Real Estate
☒ 6% Large Value          ☐ 22% Short Term Bond
☒ 4% Mid Cap Blend        ☐ 10% US Gov't Bond
☐ 3% Small Blend          ☐ 10% High Yield Bond
☐ 3% Intern'l Growth      ☐ 8% International Bond
                          ☒ 15% Cash/Stable Value ⇐ Less Risk           More Risk ⇒

40                    I accept my      42
                      recommended
                      portfolio.
                         ↘ 38

Home | Participant Access | Contact Us

Fig.3

Home | Participant Access | Retirement Info

Portfolio Builder

Section Guide
My Portfolio
Account Summary
Detail Summary
Change Contribution Rate
Statements
Transaction History
Contribution History
My Email
Change Portfolio/ Retake Questionaire
Personal Info
Employment Info
Loans
Distributions
Rollovers
Fund Info
Plan Highlights
Summary Plan Description
Your Retirement Coach
Retirement Calculator
Change Password
FAQ
Contact Us Congratulations, you have successfully built a professionally managed portfolio. The following is your personal Asset Allocation Strategy. Click on each fund for a Morningstar report of fund details.

| Fund | Asset Allocation Percent |
|---|---|
| American Funds Growth of America R3 | 11 |
| Thornburg Value R | 9 |
| Franklin Large Cap Value R | 10 |
| AIM Mid Cap Core Equity R | 6 |
| Loomis Sayles Small Cap Value Admin | 5 |
| AIM International Growth R | 3 |
| Thornburg International Value R | 4 |
| American Century Real Estate Adv | 3 |
| American Funds Intermediate Bond R3 | 16 |
| Federated US Govt: 2-5 Yr K | 8 |
| Franklin AGE High Income R | 8 |
| American Century Intl Bond Adv | 7 |
| First American Stable Asset Adv | 10 |

[Cancel] [Confirm]

ASSET ALLOCATION BASED SYSTEM FOR INDIVIDUAL INVESTOR PORTFOLIO SELECTION

FIELD OF THE INVENTION

The present invention pertains generally to investments in securities and, more particularly, to systems for selection of investment portfolios.

BACKGROUND OF THE INVENTION

Modern portfolio theory studies have shown that more than 93% of investment performance is due to asset allocation. For individual investors who attempt to follow this principle, the task of allocating investment or retirement find dollars among the thousands of marketed securities is formidable, and to be done successfully requires extensive knowledge of securities markets and investing experience. For these reasons, investing in securities was in the past done almost exclusively by trained professionals experienced in the markets and securities selection. The advent of discount brokerage services and the Internet have provided easy access to the purchase and sale of securities to virtually everyone. Although Internet based on-line trading systems have made the process of buying and selling securities very simple, they have actually increased the probability for most of losing money, particularly by those with little or no experience in long term investing.

The assets of pensions and profit sharing plans of corporations and other types of entities have also traditionally been managed by professional investors. The creation of 401(k) type self-directed retirement accounts compelled employees to make their own investment decisions, albeit from a relatively small set of plan choices. The investment allocation of retirement funds is typically done by providing employees with a list of investment funds from which to choose, and requiring the employee to designate an allocation percentage of their contribution dollars to each available find. Some basic information about the funds, such as investment objective and performance history is also provided. With only this skeletal information, plan participants are expected to correctly allocate their retirement funds for optimal return. Furthermore, there are restrictions on the frequency with which any reallocation of funds can be made.

To provide assistance to this task, retirement planning guides have proliferated, many with more practical approaches which focus on participants' projected financial needs, rather than trying to teach investment strategies. Because money management and investing has significant behavioral and emotional components, many planners make an assessment of how the participant handles or responds to these aspects of investing. This information or assessment is then used to recommend certain investments, typically mutual finds, to the participant. The participant is, however, left to make the final investment decisions on their own. So even though they have been provided with some assistance in the process, this prevailing methodology of retirement planning does not remove the participant—who is most likely a novice at investing—from making the most critical and important decisions which will directly impact their total return.

Although many different computer software-based approaches have been taken to investment and retirement account management, such systems tend to focus on data acquisition and information processing of investor profiles which are then matched to an appropriate portfolio by a professional investment manager. Financial planning software, whether creating an investor profile of including time periods of contributions and withdrawals and risk tolerance, or selecting investments which match a developed profile, all leads to the point at which specific investment decisions must be made on an individual basis for each plan participant.

SUMMARY OF THE INVENTION

The present invention provides a system for selection of a predetermined investment portfolio which is properly allocated in accordance with applicable time periods and risk tolerance of individual investors. The investor is not required and not enabled by the system to pick specific funds or securities in order to achieve an appropriate allocation. The system provides a plurality of model portfolios with differing allocations among stocks, bonds, money market, cash or cash equivalent. The responses to the questionnaire on time period of contributions to investment funds, time period of withdrawal, and risk tolerance are correlated to one of the predetermined model portfolios. A graphical representation of the suggested asset allocation is presented to the investor/participant, who is then required to accept or reject the proposed allocation, without knowing the specific securities proposed for purchase in accordance with the allocation. Importantly, the individual investor or plan participant is never required to pick specific investment vehicles.

In accordance with one aspect of the invention, there is provided a system for automated assembly of a professionally managed portfolio based upon individual investor criteria. The system ascertains the investment goals of an individual investor by a series of questions concerning time frames, risk tolerance, appreciation targets and percentage of total assets to be invested. The system then automatically selects an asset allocation model based upon the responses to the questions. The asset allocation model is presented to the investor by asset class percentage allocations. The investor can then select the proposed asset allocation model. Selection of the model then reveals the identity of the funds among which the allocation is made. Each fund in the model is linked to further information such as the fund history, investment strategy, management team, list of securities held, return history, ratings, etc. By allocating funds according to asset class categories, and then to a corresponding professionally managed portfolios of funds, the investor is protected from the potentially negative results of individual fund picking and market timing. Any re-allocation of the investment portfolio requires a re-taking of the investment objective questionnaire which leads to selection by the system of a different model portfolio based upon the responses to the questionnaire.

In accordance with another aspect of the invention, there is provided a system for proper allocation of investment capital according to an investor's financial behavioral characteristics as determined by responses to a set of questions, wherein a model portfolio is selected which correlates to the investor's responses to the questions and recommended to the investor for purchase by presentation of percentage allocation per asset class and without disclosing individual securities or funds.

And in accordance with another aspect of the invention, there is provided a method of investing an individual investor's capital in an individual investment account portfolio without allowing the investor to select individual securities in the portfolio, the method including the steps of: querying the investor on time remaining for contribution of capital to an investment account and time during which withdrawals will be made from the investment account; selecting an asset allocation model portfolio based upon the investor's responses to the queries; presenting the selected model portfolio to the investor as a recommended model portfolio by showing percentage allocations by asset class and without disclosing individual funds or securities in the recommended model portfolio; requiring the investor to accept or reject the recommended model portfolio, whereby acceptance of the recommended model portfolio allows the investor to view a list of individual funds or securities in the portfolio, and rejecting the recommended model portfolio prompts selection and presentation of a different asset allocation model portfolio.

These and other important principals and concepts of the invention are herein described an claimed in detail, with reference to the accompanying Figures.

DETAILED DESCRIPTION OF PREFERRED AND ALTERNATE EMBODIMENTS

Figure 1:
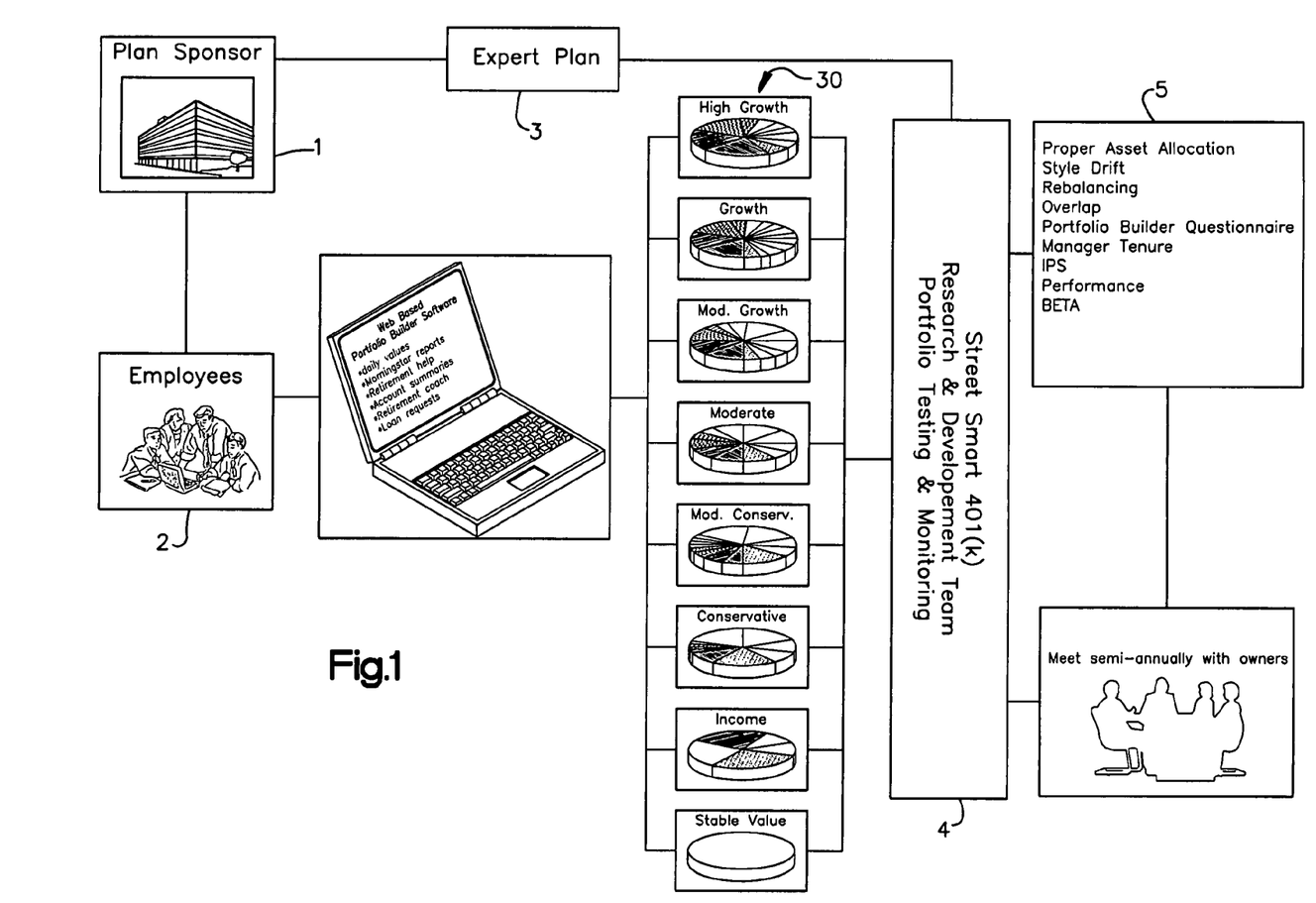
FIG. 1 is a block diagram of an organizational and operational structure of the investment system of the present invention.

FIG. 1 represents an organizational structure for operation of the investment system of the invention, described in the context of an employer sponsored investment plan such as a 401(k) plan, although the principals and concepts of the invention are equally well applicable to selection of investment portfolios outside of such qualified plans.

Figure 2:
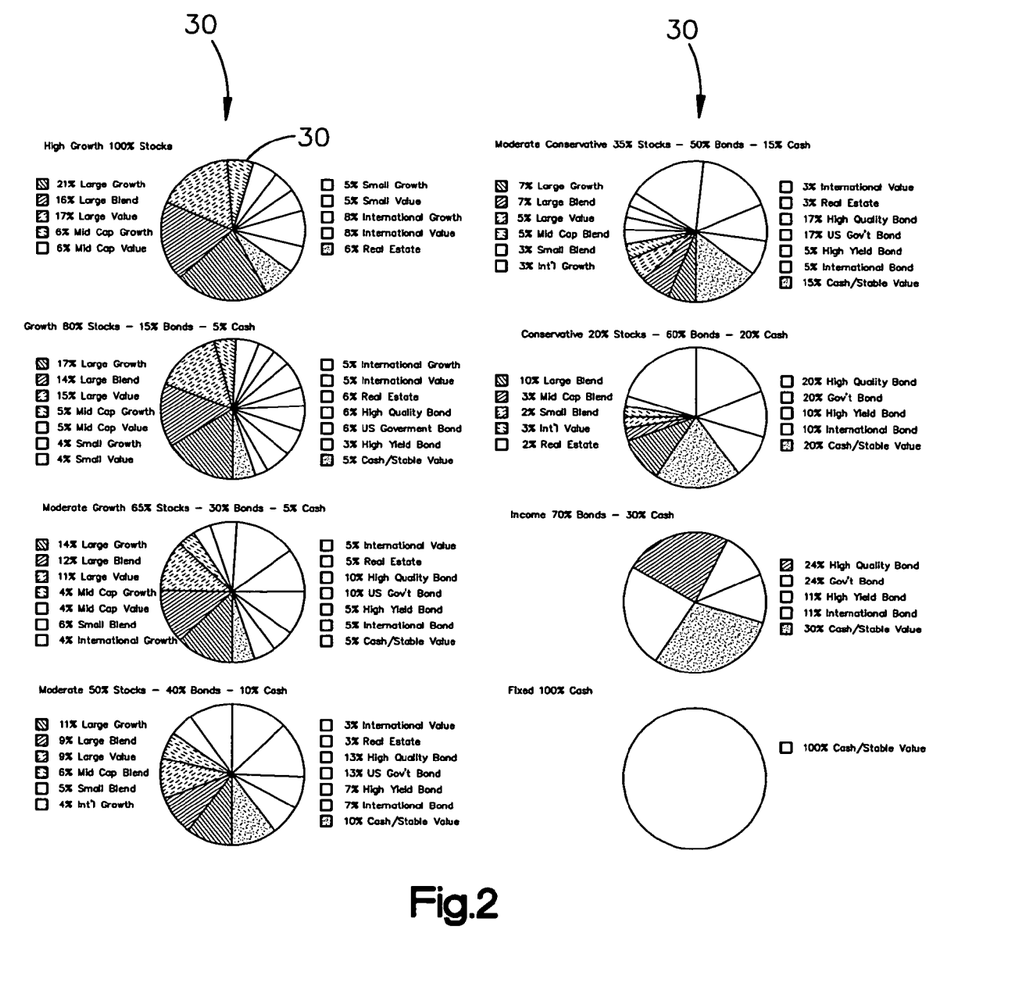
FIG. 2 is a graphical and textual listing of an asset allocation model portfolio constructed in accordance with the present invention.

A plan sponsor 1 presents to eligible employees 2 an investment plan in which employees can contribute finds, such as a qualified plan which is tax sheltered, such as 401(k) type accounts. The system of the invention, however, is equally applicable to other types of managed investment funds and plans wherein the funds of individual investors are to be allocated among different types of securities and cash. The plan or qualified plan 3 consists of a plurality of asset allocation models 30, also referred to herein as model portfolios, which are most broadly defined by the overall investment objective, such as High Growth, Growth, Moderate Growth, Moderate, Moderate Conservative, Conservative, Income and Stable Value. These broad classifications of investment portfolios are generally used nomenclature in the industry and the invention is not limited to thereto but is equally applicable to other types and categories of investments. Each asset allocation model is made up of percentage allocations to the various classes of investments selected to produce the targeted returns with the corresponding degree of risk, as shown in FIG. 2. To select the specific securities or funds which make up the model portfolios by satisfying each of the specified asset classes, professional investment management 4 performs the tasks of researching available securities and securities funds, analyzing fund strategies, management and performance history, and continuous monitoring of securities, funds and fund management once selected for inclusion in one of the model portfolios, all in accordance with the primary factors 5, including proper asset allocation correlated to the investor questionnaire, style drift, rebalancing if necessary, overlap, manager tenure, IPS, performance and beta. If in the opinion of the professional management 4, one or more of the securities or funds which are a component of a model portfolio is either underperforming or has drifted from the desired investment strategy or objective, the management 4 has the discretion to sell that security or fund and replace it with another security or fund holding which satisfies the criteria and asset class of the portfolio. This proactive managed approach to an asset allocated investment fund is markedly different than the typical investment plan in which a layman investor simply selects one or more funds and is then locked into those funds for a period of time without any ongoing monitoring, and with restrictions on the ability to make any changes to the portfolio, regardless of market performance. By contrast, the investment system of the invention essentially provides ongoing personal professional money management services to individual plan participants, by assuring proper asset allocation for total return, and then continuously monitoring performance of each of the assets of the portfolio.

Use of the system of the invention by an investor or plan participant begins with a set of inquiries of an individual investor, focused primarily on real life and behavioral factors which impact how the individual would like his/her money invested. In one embodiment, a questionnaire is presented to the investor or plan participant with questions on two main topics, time and risk tolerance. The time related questions are to determine the number of years remaining for contribution of funds to be invested, and to determine the number of retirement years for which withdrawals are to be available. These time parameters are important factors in the asset allocation model selection, primarily with respect to the targeted annual rate of return of the various assets in a portfolio. A second category of questions is designed to ascertain an investor's expectations for investment performance, risk tolerance, and emotional response to fluctuations in portfolio values. The percentage of total assets to be invested in the plan is also determined.

Non-limiting examples of questions in these categories are:
1. Given your financial goals, when will you begin withdrawing from this 401(K)? "I expect to begin making withdrawals in":
   Less than 3 years
   7 to 10 years
   11 to 15 years
   More than 15 years
2. Once you begin making withdrawals from this 401(K) how long will the money need typically your retirement age subtracted from your life expectancy.
   e.g. 85-65=20 yrs. (life retirement age)
   Less than 5 years
   For 5 to 10 years
   For 11 to 15 years
   For 16 to 20 years
   More than 20 years
3. Which statement best describes your priorities regarding your Street Smart 401(K)?
   Protecting the money I have is more important to me than making it grow
   I prefer an investment strategy designed to grow steadily and avoid sharp ups and downs even if it lowers returns Making the most money is most important to me, even if it requires some risks to do so 4. At the beginning of the year, you have $10,000 in your 401(K). The graph to the right shows the performance of four different hypothetical portfolios. Each bar gives the range of potential values at the end of one year. Example: Portfolio B could either go up to $11,000 or drop to $9,500 after one year. Which portfolio are you most comfortable with?

Portfolio A
Portfolio B
Portfolio C
Portfolio D

5. Which of the following statements best describes your attitude about investing for your Street Smart 401(K)?

Minimizing the chance for loss in my account is most important, so I am willing to accept the lower-long-term returns offered by lower risk investments Experiencing some short-term loss in value in an effort to achieve higher long-term returns is okay. However, I prefer that the majority of my investment be lower risk Seeking higher, long-term returns is important to me, so I am willing to accept substantial short-term losses Maximizing long-term investment returns is most important, and I'm willing to accept large—and sometimes dramatic—short-term losses in value to achieve this goal 6. If you had money invested in a diversified portfolio and the stock market took a downturn, when would you sell your riskier investments and put the money in safer investments?

At the first sign of loss
After a 10% loss
After a 20% loss
I wouldn't sell any of my investments. I would continue to follow a consistent, long-term investment strategy 7. Which of the following types of investments do you feel more comfortable with? An investment that might return:

5% a year on average over the long term, but has a 10% chance of experiencing a decline in value in a given year 8% a year on average over the long term, but has a 20% chance of experiencing a decline in value in a given year 11% a year on average over the long term, but has a 30% chance of experiencing a decline in value in a given year 13% a year on average over the long term, but has a 35% chance of experiencing a decline in value in a given year 8. Looking at other investments I own, such as pension, inheritance, stocks, CD's, mutual funds or personal investments, my 401(K) assets represent the following percentage:

Over 75%
50%-75%
25%-50%
less than 25%

An investor's answers to the questionnaire provide a score or rating which is correlated to the most appropriate asset allocation model which will provide the necessary rate of return and diversification for capital preservation and control of volatility. In the system, the response to each question preferably has some bearing on the percentage allocations in each of the asset classes of the model portfolios. Depending upon how the questions and corresponding multiple choice answers are drafted, the chosen responses can directly impact asset class percentage allocation, or be added to a total score which falls within a bracket correlated to a model portfolio, such as one of the model portfolios shown in FIG. 2, as further described.

The asset allocation model portfolios of FIG. 2 are professionally selected groups of securities or securities funds which fall within the asset classes necessary for diversification and growth. For example, the asset classes in the portfolios may include, in stocks, the various fund types of: large growth, large blend, large value, mid cap growth, mid cap value, small growth, small value, small blend, international growth and international value; real estate (e.g. REITS); and in bonds, the various fund types of, for example: high quality, high yield, short term, U.S. government, and international; and in cash or cash equivalents: money market and stable value funds. Other categories of funds, including hybrids of those listed, and funds with similar holdings but which are categorized differently or under different names, can of course be included among the asset classes from which the model portfolios are constructed. Not all asset classes are necessarily included in each model portfolio.

The securities of the portfolios are selected and managed by investment professionals, so that the investor or plan participant never selects, and cannot select, a security for inclusion in his/her model portfolio. The securities or funds are selected for inclusion in the model portfolios by a professional money manager, based upon analysts' percentage recommendations per asset class, and by identifying the top managers within each class, and other factors as known in the industry, including for example and without limitation: alpha, $R^2$, standard deviation, returns, security selection and removal, and ERISA compliance. The funds within each portfolio are constantly monitored for style drift, duplication of holdings, manager turnover and performance compared with their peer group asset class. This proactive monitoring and ability to replace a manger or fund quickly when needed gives a highly competitive advantage over portfolios which are managed by the novice self-directed investor or plan participant.

Upon completion of the questionnaire, the investor or plan participant is directly presented with a proposed model portfolio selected in accordance with parameters set by the questionnaire responses. Importantly, the presentation of the proposed model portfolio 30 to the investor/plan participant is in the form of the selected optimal asset allocation, which as shown can be both graphical, as by pie chart 32 or any other graphical representation of percentage components of a whole, and asset class names in fields 34. In field 36 there is provided a textual description of the process by which the model portfolio was selected, with the admonition that the investor or plan participant should select the recommended model portfolio due to the fact that it corresponds with his/her responses to the questionnaire on investment objectives. At this point the investor/plan participant is given the option of accepting the proposed model portfolio as represented by field 38, or viewing alternative model portfolios with different asset allocations representing either more risk or less risk, as represented in fields 40 and 42. Only after selecting the recommended model portfolio are the actual fund holdings disclosed to the investor/plan participant, in the form of an asset holding listing, as shown for example in FIG. 4. In this example each of the portfolio holdings are various types of mutual funds, the names of which can be associated with or hyperlinked to additional detailed information about the funds, as published by the fund proprietors or compiled by fund tracking and rating services such as Morningstar or Lipper Analytical.

In the event the investor/plan participant does not accept the recommended portfolio and instead desires a greater or lesser degree of risk as would result from a different allocation, the investor is given the opportunity to change the allocations by operation of fields 40 or 42. For example, selection of field 42, More Risk, would lead to presentation of a graphical representation of a different model portfolio, as shown for example in FIG. 5, with a greater percentage of total assets invested in stock funds, representing a higher degree of risk than the portfolio of FIG. 3. This alternate model portfolio is presented to the investor in the same general format as in FIG. 3, but with the warning, for example in field 36, that the portfolio does not match the answers given to the questionnaire, and consequently may result in account activity and volatility which is outside the investor's desired parameters. Nonetheless, the investor may choose the alternate model portfolio, by selecting it in field 38, only after which the identity of the specific securities holdings of the portfolio are revealed, as for example in the manner or format shown in FIG. 4.

The principles and concepts of the investment system of the invention can be executed in different forms, such as a paper based system in which the investor questionnaire is presented as a document which is then processed by the plan manager to select the appropriate model portfolio for presentation to the investor, who then accepts or rejects, and once a final selection is made the portfolio holdings are also disclosed on paper to the investor, similar to any paper account statement. Any changes which are made to the model portfolio by the professional managers can also be reported to the investors by a written notification.

Figure 3:
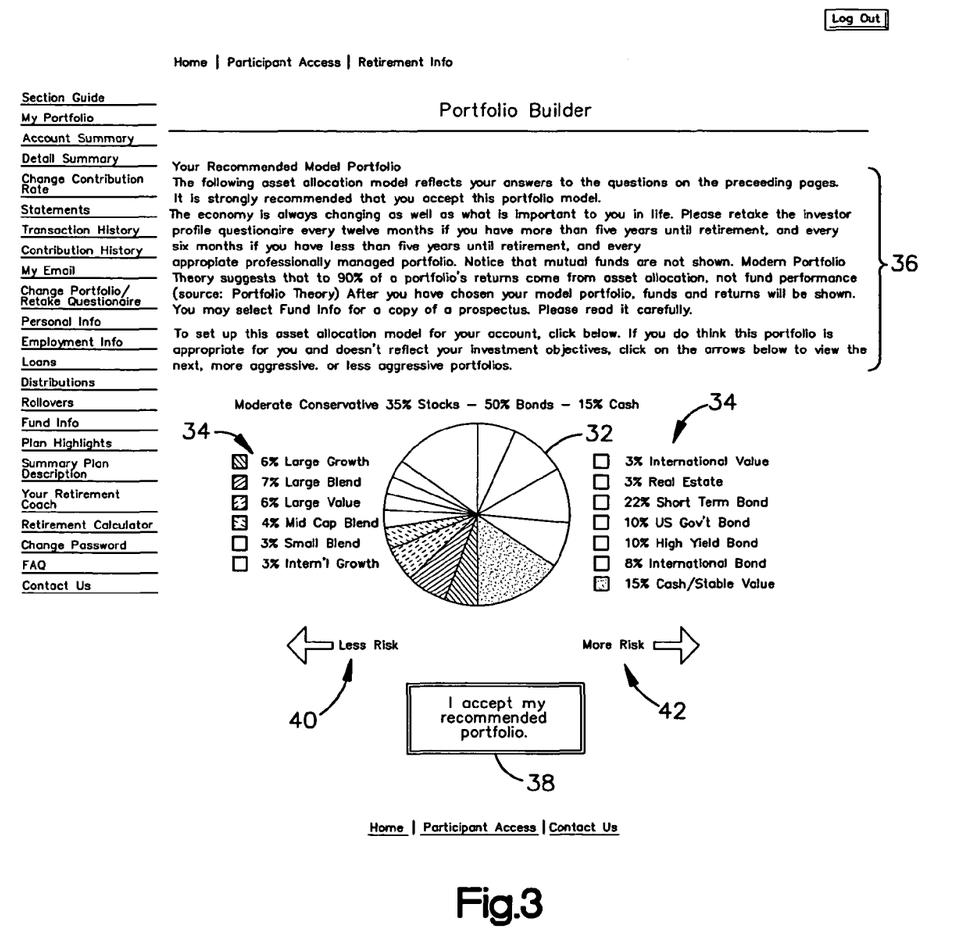
FIG. 3 is a graphical representation of an asset allocation model constructed in accordance with the present invention.
Figure 4:
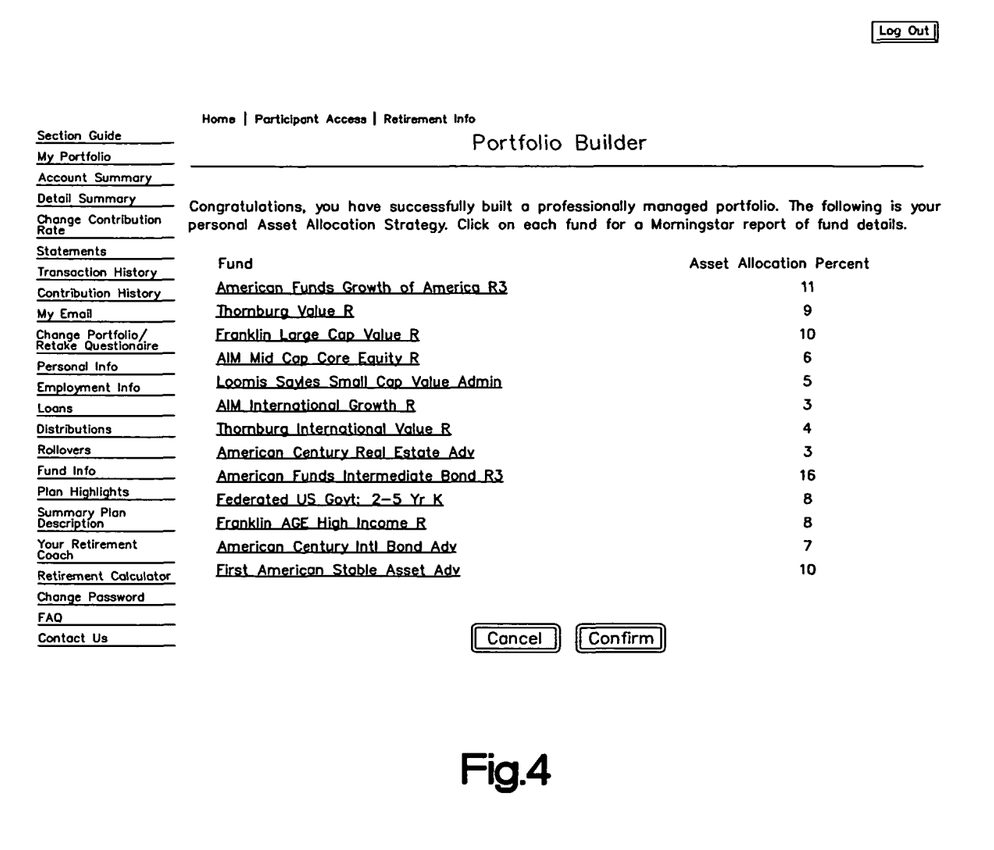
FIG. 4 is listing of assets in a model portfolio.
Figure 5:
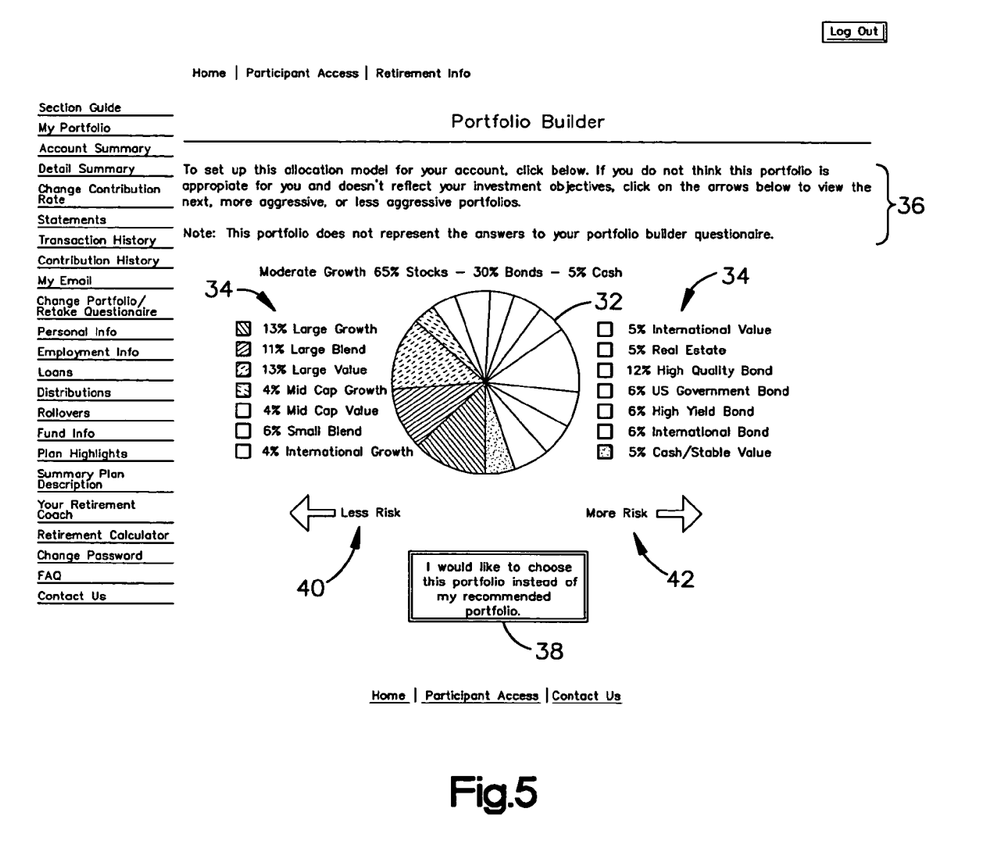
FIG. 5 is a graphical representation of another asset allocation model portfolio constructed in accordance with the present invention.
Figure 6:
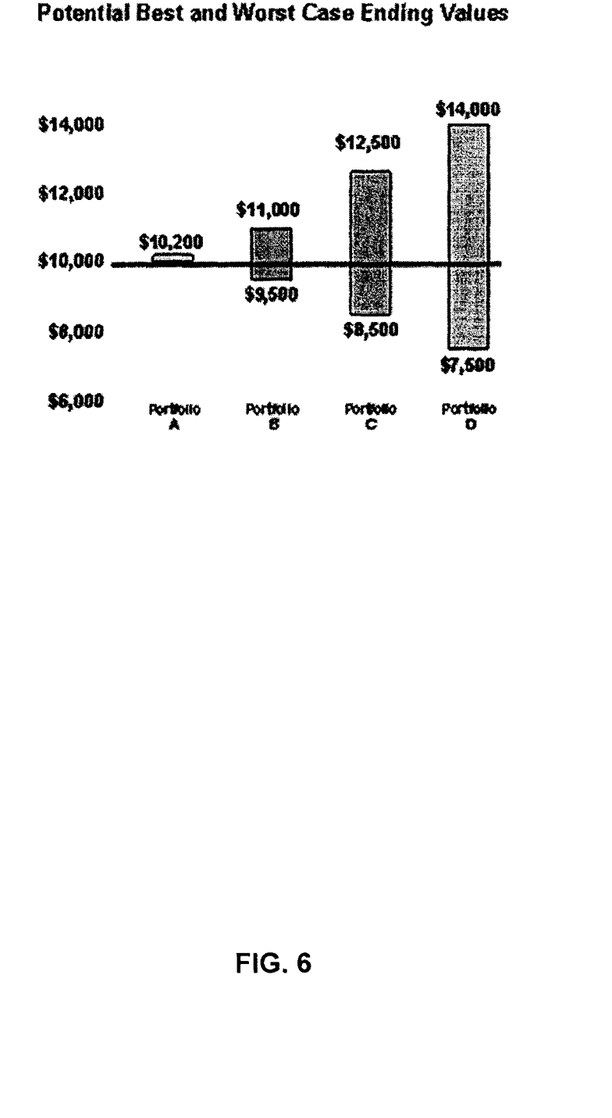
FIG. 6 is a bar graph that shows the performance of four different hypothetical portfolios.

The system can also be fully implemented and operated as a computer program which receives and processes all of the data from the investors or plan participants and generates information and screen displays to communicate model portfolio selection and portfolio holdings to the investor on a single computer, or over any type of network, including an intranet, extranet, or global computer network such as the world wide web. In a computerized digital format, the software generates screen displays which prompts the user through the system, such as explanation of the asset allocation investment approach, presentation of the questionnaire and storage of the responses to the questionnaire, presentation of the recommended portfolio without disclosing specific portfolio holdings, and then presenting specific portfolio holdings only once the portfolio has been accepted by the user. In a networked environment the system can be presented as multiple pages at a website domain, access to which can be controlled by an administrator who provides user names and passwords to investors of plan participants. The asset allocation approach of the system is fully explained on one or more pages of the site, and the process of model portfolio selection. The investor questionnaire is presented as text with active select buttons next to each of the multiple choice answers to each question. To segue from the completed questionnaire to presentation of a recommended model portfolio, a button, labeled for example BUILD MY PORTFOLIO can be placed at the end of the questionnaire. This prompts the selection of the appropriate model portfolio for display, in the format for example shown in FIG. 3. Of course other graphical and text formats for displaying this information in digital form are within the scope of the invention. The portfolio options of ACCEPT, MORE RISK and LESS RISK as shown in FIG. 3 can be implemented as separate active buttons on a web page which operate accordingly to either present alternative portfolios, or implement the accepted portfolio, followed by identification of the specific securities or fund holdings of the accepted portfolio as shown in FIG. 4. Each of the specific securities or fund holdings of the accepted portfolio can be hyperlinked to additional information about these assets, such as to the separate website of a fund or find monitoring service or to other sources of information about the assets.

What is claimed as the invention is:

1. A system for managed investment in securities by allocation of assets among a group of asset classes in an investment portfolio recommended according to an investor's responses to a questionnaire and without requiring or enabling the investor to choose individual securities or funds in which to invest, the system comprising:
    a computer, a display, a data storage device and a communications device, the computer configured to present on the display an investor questionnaire comprised of a plurality of questions pertaining to a) a number of years which the investor will contribute funds to be invested in a portfolio, b) a number of years which the investor will want to withdraw funds from the portfolio, and c) the investor's tolerance for fluctuation in the value of the portfolio, and select buttons for responses to the plurality of questions whereby the display functions as an input device for inputting responses from the investor to the plurality of questions;
    the data storage device configured to receive and store the input responses;
    the computer configured to identify and access one or more recommended portfolios from a plurality of model portfolios stored in the data storage device, each of the plurality of portfolios having different allocations of assets among a group of asset classes, the recommended portfolios being selected by the computer based upon the input responses and represented to the investor on the display by asset class allocation percentages only without identifying to the investor any individual securities or fund holdings in the recommended portfolios;
    the computer further configured to determine a correlation between the investor's input responses to the questionnaire and the recommended portfolios from which a recommended portfolio is recommended to the investor by presentation on the display based upon the investor's responses to the questionnaire, wherein a recommended portfolio is selectable by the investor by selection on the display and the investor is restricted from changing the recommended portfolio by adding or deleting any individual securities or fund holdings in the recommended portfolio, wherein a listing of securities holdings in the recommended portfolio is presented to the investor only after selection by the investor of the recommended portfolio.

2. The system of claim 1 wherein the investor questionnaire must be completed by the investor as a prerequisite to recommendation of a model portfolio to the investor.

3. The system of claim 1 wherein the investor questionnaire includes at least eight questions with at least two questions pertaining to time frames for investments and at least two questions pertaining to risk tolerance.

4. The system of claim 1 wherein the model portfolios include the asset classes of stocks, bonds and cash and at least one subclass within each asset class.

5. The system of claim 1 wherein the recommended model portfolio is presented to the investor in a graphical form which represents the asset class allocation percentages, and with numeric values of each of the asset class allocation percentages.

6. The system of claim 1 wherein the recommended model portfolio is presented to the investor with an explanation of the importance of asset allocation, and a recommendation to accept the recommended model portfolio for the reason that it is recommended based upon the investor's responses to the questionnaire.

7. The system of claim 1 wherein the recommended model portfolio is presented to the investor with the options of accepting the recommended model portfolio or accepting more or less risk than the recommended model portfolio.

8. The system of claim 7 wherein a different model portfolio is presented to the investor in response to the investor accepting more or less risk than the recommended model portfolio.

9. The system of claim 1 wherein the listing of securities held in the recommended model portfolio includes a numeric value of asset class percentage allocation for each security listed.

10. The system of claim 9 wherein the listing of securities held in the recommended model portfolio is correlated to additional information about each security listed.

11. A method of investing an individual investor's capital in an individual investment account portfolio by asset class allocation without allowing the investor to add or delete individual securities in the individual investment account portfolio, the method comprising the steps of:

communicating, by a computer connected to a communication network, with an investor's computer;

querying the investor via a computer display on time remaining for contribution of capital to an investment account and time during which withdrawals will be made from the investment account;

selecting, by operation of the computer, an asset allocation model portfolio based upon the investor's responses to the queries as a recommended model portfolio;

presenting on the computer display the recommended model portfolio to the investor by displaying percentage allocations by asset class and without displaying to the investor individual funds or securities in the recommended model portfolio;

requiring the investor to accept or reject, by the computer, the recommended model portfolio by selection of an option presented on the computer display, whereby acceptance of the recommended model portfolio allows the investor to view on the computer display a list of individual funds or securities in the recommended model portfolio, and further wherein the computer does not allow the investor to add or delete individual funds or securities to or from the recommended portfolio, and wherein rejecting the recommended model portfolio prompts selection and presentation, via the computer display, of a different recommended model portfolio to the investor, and further comprising the step of presenting a list of individual securities or funds of a recommended model portfolio to the investor via the computer display only after the investor has accepted the recommended model portfolio by selection on via the computer display for investment of capital, and restricting the investor from adding or removing any individual securities or funds to or from the recommended model portfolio.

12. The method of claim 11 further comprising the steps of providing multiple queries for the investor on time remaining for contribution of capital to an investment account and time during which withdrawals will be made from the investment account, processing responses to the queries and selecting a recommended model portfolio based upon the investor's responses to the queries, and generating a display for presentation of the recommended model portfolio to the investor, the display showing a percentage allocation per asset class only.

13. The method of claim 11 wherein the recommended model portfolio can be rejected by the investor by changing an indication of a degree of risk the investor is willing to accept in connection with the investment account, and wherein rejection of a recommended model portfolio results in selection and presentation of a different recommended model portfolio selected according to the degree of risk the investor is willing to accept.

14. The method of claim 11 wherein a model portfolio different from the recommended model portfolio is accessible by the investor by responding to the queries differently than the responses which prompted selection of the recommended model portfolio.

* * * * *